United States Patent
Schmitt et al.

(10) Patent No.: US 10,174,689 B2
(45) Date of Patent: Jan. 8, 2019

(54) METHOD AND DEVICE FOR OPERATING A DRIVE SYSTEM INCLUDING AN INTERNAL COMBUSTION ENGINE

(71) Applicant: Robert Bosch GmbH, Stuttgart (DE)

(72) Inventors: Florian Schmitt, Winnenden (DE); Udo Schulz, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 10 days.

(21) Appl. No.: 15/243,528

(22) Filed: Aug. 22, 2016

(65) Prior Publication Data
US 2017/0058796 A1 Mar. 2, 2017

(30) Foreign Application Priority Data
Aug. 26, 2015 (DE) .................... 10 2015 2 16307 U

(51) Int. Cl.
| | |
|---|---|
| *F02D 41/00* | (2006.01) |
| *F02D 41/02* | (2006.01) |
| *F02B 39/10* | (2006.01) |
| *F02B 37/10* | (2006.01) |
| *F02D 41/14* | (2006.01) |

(52) U.S. Cl.
CPC .......... *F02D 41/0007* (2013.01); *F02B 37/10* (2013.01); *F02B 39/10* (2013.01); *F02D 41/023* (2013.01); *F02D 2041/1412* (2013.01); *Y02T 10/144* (2013.01)

(58) Field of Classification Search
CPC ............... F02D 41/0007; F02D 41/023; F02D 2041/1412; F02D 2200/602; F02D 2250/24; F02D 2700/0246; F02D 2700/0256; F02B 39/10; F02B 37/10; Y02T 10/144; Y02T 10/64; Y02T 10/641; Y02T 10/642;
(Continued)

(56) References Cited

U.S. PATENT DOCUMENTS

| | | | |
|---|---|---|---|
| 2004/0093867 A1* | 5/2004 | Masuda | F02B 37/10 60/608 |
| 2007/0000481 A1* | 1/2007 | Baeurle | F02B 33/34 123/562 |

(Continued)

*Primary Examiner* — Joseph Dallo
*Assistant Examiner* — Scott A Reinbold
(74) *Attorney, Agent, or Firm* — Norton Rose Fulbright US LLP; Gerard Messina

(57) ABSTRACT

A method for operating a drive system including an internal combustion engine, the drive system including an electromotively-assisted exhaust-driven supercharging device or a strictly electrically operated supercharging device, the method including checking on whether a gear change has been initiated and a drive train has been disengaged accordingly; upon detecting an initiated gear change, adjusting the compressor power of the supercharging device by additionally facilitating electric power to the electromotively-assisted exhaust-driven supercharging device or to the strictly electrically operated supercharging device, in such a way that, at least toward the end of the gear change, a charging pressure is made available in a charging pressure section of the drive system which is higher than a charging pressure resulting at a compressor power, which corresponds to the exhaust gas enthalpy of the internal combustion engine provided during the gear change.

4 Claims, 3 Drawing Sheets

(58) Field of Classification Search
CPC ...... B60W 10/04; B60W 10/06; B60W 10/08; B60W 10/10
USPC ........................................................ 701/103
See application file for complete search history.

(56) References Cited

U.S. PATENT DOCUMENTS

2011/0034296 A1\* 2/2011 Stervik .................... B60K 6/48
 477/3
2013/0005532 A1\* 1/2013 Gibson ............... B60W 10/026
 477/115
2016/0230648 A1\* 8/2016 Sanchez Perez ....... F02B 37/10

\* cited by examiner

METHOD AND DEVICE FOR OPERATING A DRIVE SYSTEM INCLUDING AN INTERNAL COMBUSTION ENGINE

CROSS REFERENCE

The present application claims the benefit under 35 U.S.C. § 119 of German Patent Application DE 102015216307.5 filed on Aug. 26, 2015, which is expressly incorporated herein by reference in its entirety.

FIELD

The present invention relates to internal combustion engines in drive systems for motor vehicles, in particular measures for operating a supercharging device in supercharged internal combustion engines.

BACKGROUND INFORMATION

Internal combustion engines today are generally equipped with supercharging devices which provide a fresh air pressure and an elevated pressure, the so-called supercharging pressure for increasing the performance of the internal combustion engine. To reduce the overall size of the drive systems with supercharged internal combustion engines and/or to improve the flexibility of the operating modes of the supercharging, the supercharging devices may be operated completely electrically or provided as an exhaust-driven supercharging device with electrical assistance. Use of the electrically driven compressor, or the electromotive assistance, permits a performance-oriented supercharging design in general, which may be completely or partially decoupled from the available amount of exhaust gas enthalpy.

SUMMARY

According to the present invention, an example method for operating a drive system including an internal combustion engine including an at least partially electrically effectuated compression of the charge air is provided, as well as a corresponding device and drive system.

According to a first aspect of the present invention, a method for operating a drive system including an internal combustion engine is provided, the drive system including an at least partially electrically effectuated compression of the charge air, in particular via an electromotively-assisted exhaust-driven supercharging device or a strictly electrically operated supercharging device. The method includes the following steps:

checking on whether a gear change has been initiated and a drive train has been disengaged accordingly;
upon detecting an initiated gear change, adjusting a compressor power of the supercharging device by additionally providing electric power to the electromotively-assisted exhaust-driven supercharging device or to the strictly electrically operated supercharging device in such a way that, at least toward the end of the gear change, a charging pressure is made available in a charging pressure section of the drive system, which is higher than a charging pressure resulting at a compressor power which corresponds to the exhaust gas enthalpy of the internal combustion engine provided during the gear change.

One idea of the above method is to retain the compression power of a compressor during a gear change in the drive system. When there is a drop in the rotational speed of the internal combustion engine during a gear change between two drive positions, the exhaust gas enthalpy is reduced suddenly. Therefore, there is no longer enough power available for compressing the ambient air to the desired charging pressure. Due to the lower charging pressure, the air charge in the combustion chambers of the internal combustion engine is too low directly after a gear change to quickly facilitate a high engine torque. It is therefore provided that the required supercharging made available by electromotive assistance of the exhaust-driven supercharging device or by strictly electrical compression to facilitate the required charging pressure at the end of the gear change in which a clutch in the drive train is engaged.

The above method makes it possible to decouple the supercharging and the available compression power from the amount of exhaust gas enthalpy supplied by the combustion exhaust gas. In this way, the compression power may be increased during a gear change in comparison with the compression power achievable through the exhaust gas enthalpy alone. This makes it possible to maintain a charging pressure for facilitating an elevated engine power immediately after clutch engagement at the end of the gear change. In particular, the charging pressure may be set in such a way that the air charge in the combustion chambers of the internal combustion engine after a gear change is sufficient or approximately sufficient for facilitating the required or requested engine power. This results in a faster and more convenient acceleration performance of the motor vehicle after a gear change since the response of the internal combustion engine is greater.

In addition, when driving up-hill, the drop in speed during gear changes, in particular in the case of drive systems for heavy commercial vehicles may be diminished. In addition, greater overall efficiency of the drive system is achievable with an appropriate design of the supercharging device.

Furthermore, checking on whether a gear change has been initiated may include checking on whether the clutch pedal has been operated or checking on whether there has been a corresponding signal for automatic clutch disengagement in an automatic transmission system.

An engine torque required after a gear change may be ascertained in particular and a resulting charging pressure for the internal combustion engine may be ascertained therefrom, electric power being supplied during the gear change to the electromotively-assisted exhaust-driven supercharging device or the strictly electrically operated supercharging device in order to adjust the resulting compressor power for setting the charging pressure.

It may be provided that the engine torque required after the gear change is determined as a function of the operating point, the operating point being indicated by at least one of the following pieces of information:

the type of gear change,
one or multiple operating parameter(s) of the internal combustion engine, in particular the engine temperature and the ambient air temperature,
the vehicle speed, and
the driver input torque.

In addition, an engine torque required after the gear change may be ascertained on the basis of the position of the accelerator pedal, in particular when a gear change to a lower drive position is detected or assumed.

It may be provided that an engine torque required after a gear change is adjusted, so that the drive power after the gear change corresponds to the drive power before the gear change, in particular when a gear change to a lower drive position is detected or assumed.

In particular, the engine torque required after the gear change may be ascertained from the product of the engine torque applied before the gear change and the engine rotational speed prevailing before the gear change divided by the engine rotational speed effectuated by the change in the drive position during the gear change in accordance with the gear reduction ratio.

According to another aspect, a device for operating a drive system including an internal combustion engine is provided, the drive system including an electromotively-assisted exhaust-driven supercharging device or a strictly electrically operated supercharging device. The device is designed:
- to check whether a gear change has been initiated and a drive train has been disengaged accordingly;
- to adjust the compressor power of the charging device by additionally providing electric power to the electromotively-assisted exhaust-driven supercharging device or to the strictly electrically operated supercharging device when it is detected that a gear change has been initiated, so that, at least at the end of the gear change, a charging pressure is facilitated in a charging pressure section of the drive system which is higher than a charging pressure resulting at compressor power corresponding to the exhaust gas enthalpy provided during the gear change.

According to another aspect, a drive system including an internal combustion engine, the above device and either an electromotively-assisted exhaust-driven supercharging device or a strictly electrically operated supercharging device, are provided.

BRIEF DESCRIPTION OF THE DRAWINGS

Specific embodiments are explained in greater detail below on the basis of the figures.

DETAILED DESCRIPTION OF EXAMPLE EMBODIMENTS

Figure 1:
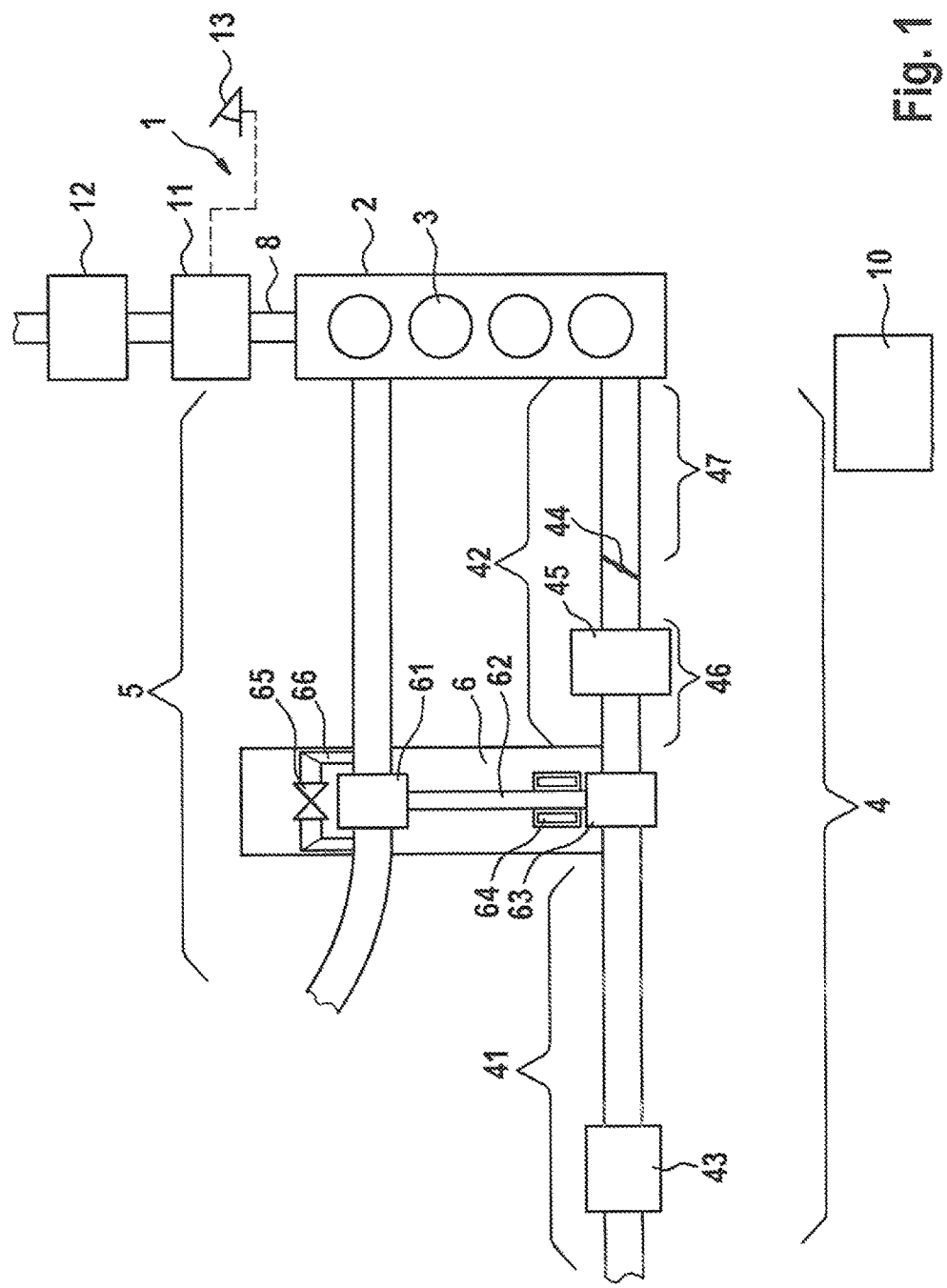
FIG. 1 shows a diagram of a drive system including an electromotively-assisted exhaust-driven supercharging device.

FIG. 1 schematically shows a drive system 1. Drive system 1 includes an internal combustion engine 2, which has multiple cylinders 3. Internal combustion engine 2 may be designed as a gasoline engine, for example, or as some other air-formed internal combustion engine.

Air is supplied to internal combustion engine 2 via an air supply system 4, and combustion exhaust gases from cylinders 3 of internal combustion engine 2 are discharged via an exhaust gas discharge tract 5. A supercharging device 6 is provided in air supply system 4 and in exhaust gas discharge tract 5. Supercharging device 6 is coupled to exhaust gas discharge tract 5 to convert exhaust gas enthalpy from combustion exhaust gas into mechanical energy. The mechanical energy is used to compress ambient air in air supply system 4.

Supercharging device 6 therefore has a turbine 61, which is provided in exhaust gas discharge tract 5 to convert the exhaust gas enthalpy present in the combustion exhaust gas into a rotational movement of a shaft 62. Shaft 62 of supercharging device 6 is coupled to a compressor 63, which provides compression power as a function of the rotation of shaft 62, to aspirate ambient air via a section 41 on the input side and make it available at a charging pressure in a section 42 on the output side. Section 41 of air supply system 4 on the input side may also be provided with an air filter 43, which filters the aspirated fresh air.

A throttle valve 44 is provided in section 42 of air supply system 4 on the output side, which is situated between a charging pressure section 46 and an intake manifold section 47, which are parts of section 42 on the output side. Throttle valve 44 controls the air supply to the combustion chambers of cylinder 3 of internal combustion engine 2 from charging pressure section 46.

A charge air cooler 45 may be provided in charge air section 46 which cools the charge air which has been heated by compression in compressor 63. The density of the charge air in charge air section 46 may therefore be increased, so that a greater air charge may be obtained in cylinders 3 of internal combustion engine 2.

Compressor 63 in air supply system 4 may still be short-circuited by a charging pressure discharge line including a charging pressure discharge valve situated therein.

In the exemplary embodiment shown here, shaft 62 is coupled to an electric motor 64 (electromotive assistance), so that this is able to apply an additional torque to shaft 62 according to an activation to electromotively increase the compression power.

Supercharging device 6 may additionally be provided with a charger plate, which is designed in the specific embodiment shown here with a variably activatable wastegate valve 65 in a bypass line 66. Bypass line 66 connects the input side and the output side of turbine 61, so that an efficiency of turbine 61 may be set as a function of an activation of wastegate valve 65. Which proportion of exhaust gas enthalpy is converted into kinetic power, i.e., into rotational power of shaft 62, is indicated in particular. Instead of wastegate valve 65 in bypass line 66, a VTG controller (VTG: variable turbine geometry) may also be provided to set the efficiency of turbine 61 or to set the proportion of exhaust gas enthalpy converted into mechanical power.

Internal combustion engine 2 has an output shaft 8, which is connected via a clutch 11 to a manual gearbox 12. Clutch 11 may be operated manually, i.e., for example, via a clutch pedal, or automatically, for example, by signaling by a transmission control unit (not shown). Manual gearbox 12 makes it possible to set various drive positions.

A control unit 10 is provided, which operates the internal combustion engine as a function of state variables of drive system 1. State variables, for example, a rotational speed of internal combustion engine 2, a charging pressure of the compressed fresh air (charge air) in charging pressure section 46, a charge air temperature of the charge air in charging pressure section 46, an exhaust gas temperature of the expelled combustion exhaust gases, an aspirated air-mass flow on the input side of compressor 63 and similar state variables, may be detected by corresponding sensors or predefined in modeled form.

Control unit 10 is designed to activate positioning elements such as, for example, a throttle valve positioning element for adjusting throttle valve 44, injectors for supplying fuel (not shown), wastegate valve 65, electric motor 64 and the like as a function of the detected and provided state variables in order to trigger internal combustion engine 2 according to a predefined setpoint torque.

Figure 2:
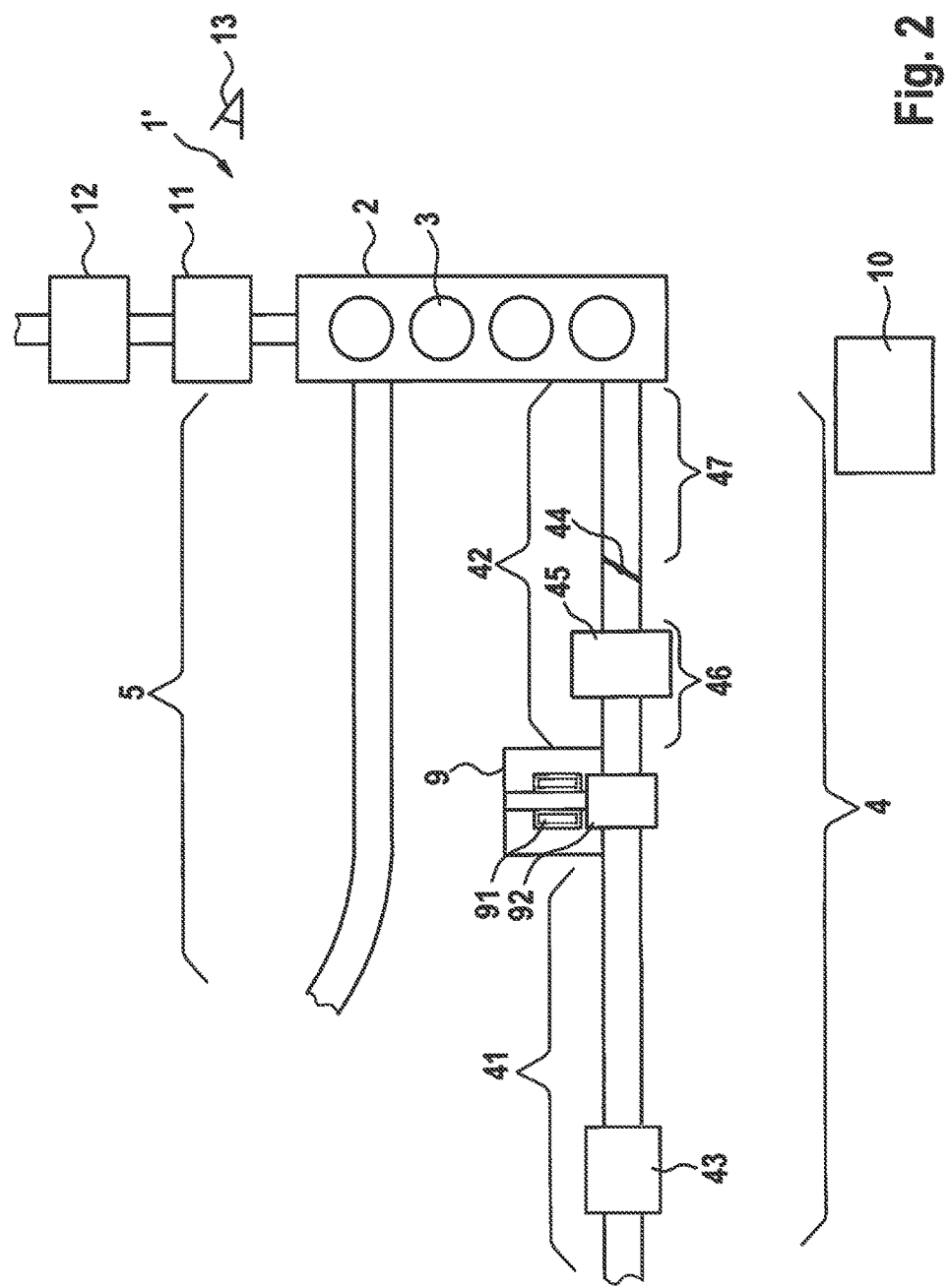
FIG. 2 shows a diagram of a drive system including an electromotively-operated compressor.

FIG. 2 shows another drive system 1' having a design similar to that of the drive system 1 of FIG. 1. Instead of exhaust-driven supercharging device 6, an electrically operated supercharging device 9 is provided, including an electric motor 91 and a compressor 92. Electrically operated supercharging device 9 is controllable independently of the available exhaust gas enthalpy since the compression power is made available only by supplying electric power.

Figure 3:
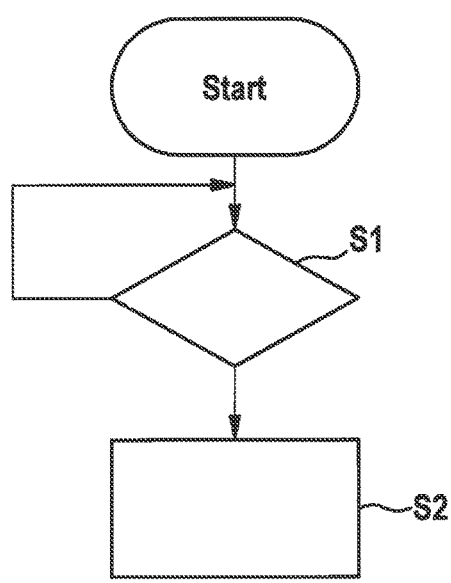
FIG. 3 shows a flow chart to illustrate a method for operating the drive system of FIGS. 1 and 2.

Drive system 1 and drive system 1' may be controlled by control unit 10 according to a method for operating drive system 1, 1', which is described below on the basis of the flow chart in FIG. 3, using an electromotively-assisted exhaust-driven supercharging device 6 or an electrically operated supercharging device 9.

In step S1, there is a check on whether a gear change has been initiated. This may be detected, for example, by actuation of a clutch pedal or in the case of an automatic transmission, by a corresponding signal for automatic clutch disengagement. If the start of a gear change is detected, the method is continued with step S2; otherwise (alternative: no) the method reverts to step S1.

In a typical gear change during an acceleration phase, the engine power is reduced between clutch disengagement and clutch reengagement. Only after the drive position has been changed is the clutch engaged and the engine power increased accordingly. In the case of a prolonged gear change, this may result in the internal combustion engine dropping back into the idling state. After clutch disengagement, the rotational speed of an exhaust-driven supercharging device therefore drops, so that, after the end of the gear change, it must be brought back to the intended operating point, at which the charging device facilitates the required charging pressure. Therefore, for a certain period of time immediately after the gear change, only a comparatively low air charge and an accordingly a low engine power are made available since the charge air is built back up to a sufficient charging pressure only comparatively slowly.

To avoid this effect, which is known as turbo lag, it is provided in step S2 that the rotational speed of the compressor of the supercharging device is not allowed to drop after disengagement of the clutch to the extent that would be the case with a strictly exhaust-driven supercharging device. Instead, until renewed clutch engagement, the rotational speed is maintained at a level required for facilitating a uniform charging pressure and/or a charging pressure after clutch engagement. This is thus achieved in that, according to the specific embodiment of FIG. 1, electric motor 64 of the electromotively-assisted supercharging device 6 is appropriately activated or by continuing to operate the electric motor of electrically operated supercharging device 9 in such a way that the predefined charging pressure, i.e., the charging pressure required after clutch engagement, may be made available accordingly.

This results in an improved acceleration response of the vehicle after the gear change since a high air charge in the combustion chambers of internal combustion engine 2 is retained and therefore a higher engine torque is available more quickly.

In particular, during the gear change, the rotational speed of compressor 63, 92 may be adapted as a function of the operating point, whereby the operating point may be determined by the type of gear change, one or multiple operating parameters of the internal combustion engine, such as the engine temperature, the ambient air temperature and the like, the vehicle speed and the driver input torque. The type of gear change may be specified by the engaged drive position and the drive position intended after the gear change. This specification may be obtained via a gear selector switch or by the transmission control unit in the case of an automatic transmission. Upshifting may be assumed, for example, via clutch actuation in an acceleration process, and downshifting may be assumed in a clutch actuation in a deceleration process.

The torque command, which is indicated by the driver input torque, may be ascertained on the basis of the position of the accelerator pedal. If the engine torque supplied or suppliable at the start of the gear change at the instantaneous engine rotational speed is lower than the torque command requested by the driver, then the transmission is shifted to a lower drive position (lower gear). The torque command after the gear change thus corresponds to the torque command before the gear change.

The torque command after a gear change may be ascertained via a drive power in an acceleration process. When an engine rotational speed is greater than a predefined rotational speed threshold value and an intent is detected to change the drive position, for example, by detecting the actuation of a clutch or by signaling a transmission control unit for an automatic transmission, then upshifting is assumed. If a likely upshifting of the drive position is detected, the drive power transferred via the drive train before the gear change may correspond to the drive power to be transferred via the drive train after the gear change. The drive power may be assumed to be proportional to the product of the engine torque and the engine rotational speed. The change in the drive position during upshifting causes a reduction in rotational speed according to the gear reduction ratio of the changed drive position, which may be compensated by an increase in torque at the same drive power, i.e., the product of the engine torque and the engine rotational speed should be the same before and after the gear change. The resulting engine torque could be used as the torque command after the gear change.

It is therefore possible to ascertain the torque command from the operating point before the start of the gear change and thus the demand for an air charge to be supplied after the gear change. This yields a charging pressure to be adjusted, so that the rotational speed of compressor 63, 92 may be adjusted appropriately with electrical assistance.

What is claimed is:

1. A method for operating a drive system including an internal combustion engine having an at least partially electrically effectuated compression, the drive system including an electromotively-assisted exhaust-driven supercharging device or a strictly electrically operated supercharging device, the method comprising:
    checking whether a gear change has been initiated and a drive train has been disengaged accordingly;
    ascertaining a torque command from an operating point before a start of the gear change and a corresponding demand for an air charge to be supplied after the gear change, so as to provide a charging pressure to be adjusted, so that a rotational speed of a compressor is adjustable; and
    adjusting, upon detecting an initiated gear change, the charging pressure of the supercharging device by additionally facilitating electrically effectuated compressor power to the electromotively-assisted exhaust-driven supercharging device or to the strictly electrically operated supercharging device, so that, at least toward an end of the gear change, the charging pressure is made available in a charging pressure section of the drive system which is higher than a charging pressure resulting at a compressor power which corresponds to an exhaust gas enthalpy of the internal combustion engine provided during the gear change;

wherein the checking of whether a gear change has been initiated includes one of: i) checking an actuation of a clutch pedal, or ii) checking whether there is a corresponding signal for automatic clutch disengagement in the case of an automatic transmission;

wherein an engine torque required after the gear change is determined as a function of an operating point, and a resulting charging pressure for the internal combustion engine is ascertained therefrom, the operating point being indicated by at least one of the following pieces of information: i) a type of gear change, ii) engine temperature and ambient air temperature, iii) vehicle speed, and iv) the driver input torque;

wherein the engine torque required after the gear change is ascertained on the basis of the position of an accelerator pedal when a gear change to a lower drive position is detected or assumed;

wherein the engine torque required after the gear change is adjusted so that the drive power after the gear change corresponds to the drive power before the gear change when a gear change to a lower drive position is one of detected or assumed;

wherein the engine torque required after the gear change is ascertained from a product of the engine torque applied before the gear change and an engine rotational speed before the gear change divided by an engine rotational speed after the gear change effectuated by a change of a drive position during the gear change according to the gear reduction ratio.

2. A device for operating a drive system, including an internal combustion engine, the drive system including an electromotively-assisted exhaust-driven supercharging device or a strictly electrically operated supercharging device, comprising:

a control unit configured to perform the following:

checking whether a gear change has been initiated and a drive train has been disengaged accordingly;

ascertaining a torque command from an operating point before a start of the gear change and a corresponding demand for an air charge to be supplied after the gear change, so as to provide a charging pressure to be adjusted, so that a rotational speed of a compressor is adjustable; and adjusting, upon detecting an initiated gear change, the charging pressure of the supercharging device by facilitating electric power to the electromotively-assisted exhaust-driven supercharging device or to the strictly electrically operated supercharging device so that, at least toward an end of the gear change, a charging pressure is provided in a charging pressure section of the drive system which is higher than a charging pressure resulting from compressor power corresponding to the exhaust gas enthalpy of the internal combustion engine provided during the gear change;

wherein the checking of whether a gear change has been initiated includes one of: i) checking an actuation of a clutch pedal, or ii) checking whether there is a corresponding signal for automatic clutch disengagement in the case of an automatic transmission;

wherein an engine torque required after the gear change is determined as a function of an operating point, and a resulting charging pressure for the internal combustion engine is ascertained therefrom, the operating point being indicated by at least one of the following pieces of information: i) a type of gear change, ii) engine temperature and ambient air temperature, iii) vehicle speed, and iv) the driver input torque;

wherein the engine torque required after the gear change is ascertained on the basis of the position of an accelerator pedal when a gear change to a lower drive position is detected or assumed;

wherein the engine torque required after the gear change is adjusted so that the drive power after the gear change corresponds to the drive power before the gear change when a gear change to a lower drive position is one of detected or assumed;

wherein the engine torque required after the gear change is ascertained from a product of the engine torque applied before the gear change and an engine rotational speed before the gear change divided by an engine rotational speed after the gear change effectuated by a change of a drive position during the gear change according to the gear reduction ratio.

3. A drive system, comprising:

an internal combustion engine;

one of: i) an electromotively-assisted exhaust-driven supercharging device, or ii) a strictly electrically operated supercharging device; and a device for operating the drive system, including a control unit configured to perform the following:

checking whether a gear change has been initiated and a drive train has been disengaged accordingly;

ascertaining a torque command from an operating point before a start of the gear change and a corresponding demand for an air charge to be supplied after the gear change, so as to provide a charging pressure to be adjusted, so that a rotational speed of a compressor is adjustable; and adjusting, upon detecting an initiated gear change, the charging pressure of the supercharging device by facilitating electric power to the electromotively-assisted exhaust-driven supercharging device or to the strictly electrically operated supercharging device so that, at least toward an end of the gear change, a charging pressure is provided in a charging pressure section of the drive system which is higher than a charging pressure resulting from compressor power corresponding to the exhaust gas enthalpy of the internal combustion engine provided during the gear change;

wherein the checking of whether a gear change has been initiated includes one of: i) checking an actuation of a clutch pedal, or ii) checking whether there is a corresponding signal for automatic clutch disengagement in the case of an automatic transmission;

wherein an engine torque required after the gear change is determined as a function of an operating point, and a resulting charging pressure for the internal combustion engine is ascertained therefrom, the operating point being indicated by at least one of the following pieces of information: i) a type of gear change, ii) engine temperature and ambient air temperature, iii) vehicle speed, and iv) the driver input torque;

wherein the engine torque required after the gear change is ascertained on the basis of the position of an accelerator pedal when a gear change to a lower drive position is detected or assumed;

wherein the engine torque required after the gear change is adjusted so that the drive power after the gear change corresponds to the drive power before the gear change when a gear change to a lower drive position is one of detected or assumed;

wherein the engine torque required after the gear change is ascertained from a product of the engine torque applied before the gear change and an engine rotational speed before the gear change divided by an engine rotational speed after the gear change effectuated by a change of a drive position during the gear change according to the gear reduction ratio.

4. A non-transitory machine-readable memory medium having a computer program, which is executable by a processor, comprising:

a program code arrangement having program code for operating a drive system including an internal combustion engine having an at least partially electrically effectuated compression, the drive system including an electromotively-assisted exhaust-driven supercharging device or a strictly electrically operated supercharging device, by performing the following:

checking whether a gear change has been initiated and a drive train has been disengaged accordingly;

ascertaining a torque command from an operating point before a start of the gear change and a corresponding demand for an air charge to be supplied after the gear change, so as to provide a charging pressure to be adjusted, so that a rotational speed of a compressor is adjustable; and adjusting, upon detecting an initiated gear change, the charging pressure of the supercharging device by additionally facilitating electrically effectuated compressor power to the electromotively-assisted exhaust-driven supercharging device or to the strictly electrically operated supercharging device, so that, at least toward an end of the gear change, a charging pressure is made available in a charging pressure section of the drive system which is higher than a charging pressure resulting at a compressor power which corresponds to an exhaust gas enthalpy of the internal combustion engine provided during the gear change;

wherein the checking of whether a gear change has been initiated includes one of: i) checking an actuation of a clutch pedal, or ii) checking whether there is a corresponding signal for automatic clutch disengagement in the case of an automatic transmission;

wherein an engine torque required after the gear change is determined as a function of an operating point, and a resulting charging pressure for the internal combustion engine is ascertained therefrom, the operating point being indicated by at least one of the following pieces of information: i) a type of gear change, ii) engine temperature and ambient air temperature, iii) vehicle speed, and iv) the driver input torque;

wherein the engine torque required after the gear change is ascertained on the basis of the position of an accelerator pedal when a gear change to a lower drive position is detected or assumed;

wherein the engine torque required after the gear change is adjusted so that the drive power after the gear change corresponds to the drive power before the gear change when a gear change to a lower drive position is one of detected or assumed;

wherein the engine torque required after the gear change is ascertained from a product of the engine torque applied before the gear change and an engine rotational speed before the gear change divided by an engine rotational speed after the gear change effectuated by a change of a drive position during the gear change according to the gear reduction ratio.

* * * * *